Patented Aug. 11, 1925.

1,549,442

UNITED STATES PATENT OFFICE.

BRUCE K. BROWN, OF TERRE HAUTE, INDIANA, ASSIGNOR TO COMMERCIAL SOLVENTS CORPORATION, OF TERRE HAUTE, INDIANA, A CORPORATION OF MARYLAND.

METHOD OF AND COMPOSITION FOR CLEANING METALS.

No Drawing. Application filed January 28, 1925. Serial No. 5,372.

*To all whom it may concern:*

Be it known that I, BRUCE K. BROWN, a citizen of the United States, residing at Terre Haute, in the county of Vigo and State of Indiana, have invented a certain new and useful Method of and Composition for Cleaning Metals, of which the following is a specification.

This invention relates to the cleaning and preserving of metal surfaces and has as its object the development of a new and novel method of and composition for the removal of rust from iron and steel, and the preparation of rustproof ferrous surfaces.

In the past it has been proposed to remove rust from, and to prevent further rusting of, ferrous surfaces by applying solutions of phosphoric acid and then removing the excess acid by washing the surface with water. Strong acids such as sulfuric acid and hydrochloric acid also have the property of quickly removing rust from iron surfaces, but these acids attack the iron itself and leave the metallic surface in such a chemical state that further rusting is accelerated. For this reason, phosphoric acid, and other acids which deposit insoluble iron salts on the surface treated as for example oxalic acid, are much to be preferred for rust removing purposes.

The stable insoluble iron phosphate formed on the metal surface during the employment of such a rust removing composition protects the metal surface beneath from further rusting and also acts as an excellent "primer coat" for the application of paint or lacquer.

While solutions of acids forming insoluble iron salts may be employed in removing rust and in protecting iron surfaces from further rusting, such solutions are ineffective for use on iron surfaces on which grease or oil has been deposited. The acid solutions do not "cut" or emulsify the oily coating, which acts as an effective protective surface for both rust and iron. It has therefore been proposed to use mixtures of phosphoric acid and ethyl alcohol for these purposes, the latter ingredient being employed to reduce the surface tension of the solution, to "cut" the grease and oil, and to assist in the removal of rust. Ethyl alcohol was found, however, to have several serious disadvantages when employed in rust removing compositions. Its volatility caused quick evaporation and consequent waste of material, its vapors were objectionable, and it was found to cut grease and oil imperfectly.

It was later proposed to substitute fusel oil and the higher monohydric alcohols, such as propyl, butyl, and amyl alcohol, for the ethyl alcohol formerly used in rust removing compositions. Compositions of this nature were more efficient than ethyl alcohol-acid mixtures on account of the superior grease and oil cutting action of the higher alcohols, and their less volatile nature. The higher monohydric alcohols are not completely miscible with water and hence in rust removing compositions containing these substances it is necessary to employ ethyl alcohol, acetone, or other solvent to secure miscibility between the higher monohydric alcohol and the acid solution.

It is the object of my invention to provide an improved rust removing composition and a method of employing the same, whereby the disadvantages attendant on rust removing compositions known in the prior art are obviated and greater efficiency of operation is attained.

I have discovered that 4-hydroxy-2-keto-4-methyl pentane may be compounded with phosphoric acid, or other acids forming insoluble iron salts, to form an excellent rust removing and rust preventing composition. 4-hydroxy-2-keto-4-methyl pentane is a complex alcoholic ketone formed by the polymerization of acetone and is sometimes commercially known as diacetone alcohol. This substance has the following structural formula,—

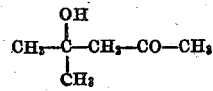

It is a colorless liquid boiling at 163° C. and is completely miscible with water in all proportions.

A mixture of phosphoric acid and 4-hydroxy-2-keto-4-methyl pentane forms a stable solution which may be readily applied to metal surfaces. The very low volatility of the material prevents rapid evaporation of the mixture and thus promotes great economy in use. The 4-hydroxy-2-keto-4-methyl pentane present in the mixture reduces the surface tension, improves the surface-covering power of the liquid and acts effectively as a grease remover.

I have found by experiment that a mixture of one part of 85% solution of phosphoric acid and one part of 4-hydroxy-2-keto-4-methyl pentane produces a highly satisfactory rust remover and rust preventative. I have also found that the addition of a considerable quantity of water to the composition is possible without a reduction in quality. If desired, other diluents such as ethyl alcohol, acetone, or benzol may be employed.

While the percentage of diluent employed may be widely varied, I prefer to employ about thirty to forty per cent of diluent by volume.

In employing my improved composition for the removal of rust from iron surfaces and the prevention of further rusting, the composition may be applied to the surface by dipping the article to be coated in the solution, or by applying the solution with a brush or cloth. In ordinary practice the solution may be washed off or rubbed off after a few minutes of contact with the surface. In the case of badly rusted articles it is sometimes necessary to rub off the loosened rust by abrasive means.

Now, having fully described my invention, I claim the following as new and novel:—

1. The method of cleaning iron and preserving it from rusting consisting in submitting it to the action of an admixture of 4-hydroxy-2-keto-4-methyl pentane and an acid forming insoluble iron salts and removing said admixture from the iron.

2. The method of cleaning iron consisting in submitting it to the action of an admixture of 4-hydroxy-2-keto-4-methyl pentane, an acid forming insoluble iron salts, and a diluent and removing said admixture from the iron.

3. The method of cleaning iron and preserving it from rusting consisting in submitting it to the action of an admixture of 4-hydroxy-2-keto-4-methyl pentane, phosphoric acid, and a diluent and removing said admixture from the iron.

4. The method of cleaning iron and preserving it from rusting, consisting in submitting it to the action of an admixture of 4-hydroxy-2-keto-4-methyl pentane, phosphoric acid, and water and removing said admixture from the iron.

5. The method of cleaning iron and preserving it from rusting consisting in submitting it to the action of an admixture of one part of 4-hydroxy-2-keto-4-methyl pentane and one part of 85% phosphoric acid and removing said admixture from the iron.

6. The method of cleaning iron and preserving it from rusting consisting in submitting it to the action of one part of 4-hydroxy-2-keto-4-methyl pentane, one part of 85% phosphoric acid, and two parts of diluent and removing said admixture from the iron.

7. The method of cleaning iron and preserving it from rusting consisting in submitting it to the action of one part of 4-hydroxy-2-keto-4-methyl pentane, one part of 85% phosphoric acid, and two parts of water and removing said admixture from the iron.

8. A composition of matter for cleaning and preserving iron surfaces, comprising an admixture of 4-hydroxy-2-keto-4-methyl pentane, an acid forming insoluble iron salts, and a diluent.

9. A composition of matter for cleaning and preserving iron surfaces, comprising an admixture of 4-hydroxy-2-keto-4-methyl pentane and phosphoric acid.

10. A composition of matter for cleaning and preserving iron surfaces, comprising an admixture of 4-hydroxy-2-keto-4-methyl pentane, phosphoric acid, and water.

11. A composition of matter for cleaning and preserving iron surfaces, comprising an admixture of one part 4-hydroxy-2-keto-4-methyl pentane, one part 85% phosphoric acid and two parts of water.

BRUCE K. BROWN.